US008812028B2

(12) United States Patent
Yariv et al.

(10) Patent No.: US 8,812,028 B2
(45) Date of Patent: Aug. 19, 2014

(54) WIRELESS IDENTIFIERS FOR PROXIMITY APPLICATIONS

(75) Inventors: Eran Yariv, Zichron (IL); Keren Master, Kfar Saba (IL); Daniel Sitton, Tel Aviv (IL); Roy Varshavsky, Even Yehuda (IL); Yoram Yaacovi, Kfar Hess (IL)

(73) Assignee: Microsoft Corporation, Redmond, WA (US)

( * ) Notice: Subject to any disclaimer, the term of this patent is extended or adjusted under 35 U.S.C. 154(b) by 691 days.

(21) Appl. No.: 13/049,900

(22) Filed: Mar. 17, 2011

(65) Prior Publication Data
US 2012/0238285 A1    Sep. 20, 2012

(51) Int. Cl.
*H04W 24/00* (2009.01)
(52) U.S. Cl.
USPC ............... 455/456.3; 455/456.1; 455/519
(58) Field of Classification Search
USPC .................... 455/456.3, 456.1, 519
See application file for complete search history.

(56) References Cited

U.S. PATENT DOCUMENTS

| 7,720,037 | B2 | 5/2010 | Bill | |
|---|---|---|---|---|
| 2005/0174975 | A1* | 8/2005 | Mgrdechian et al. | 370/338 |
| 2007/0027614 | A1* | 2/2007 | Reeser et al. | 701/200 |
| 2008/0080397 | A1 | 4/2008 | Niranjan et al. | |
| 2009/0003662 | A1 | 1/2009 | Joseph et al. | |
| 2010/0250135 | A1 | 9/2010 | Li et al. | |

OTHER PUBLICATIONS

"iGroups: Apple's New iPhone Social App in Development", Retrieved at<< http://www.patentlyapple.com/patently-apple/2010/03/igroups-apples-new-iphone-social-app-in-development.html>>, Mar. 18, 2010, pp. 8.

Porras, Jari, "Social Networking on Mobile Environment on top of PeerHood", Retrieved at<< http://www.doria.fi/bitstream/handle/10024/43204/nbnfi-fe200812122252.pdf?sequence=1>>, Nov. 14, 2008, pp. 68.
Pietilainen, et al., "MobiClique: Middleware for Mobile Social Networking", Retrieved at<< http://conferences.sigcomm.org/sigcomm/2009/workshops/wosn/papers/p49.pdf>>,Aug. 17, 2009, pp. 49-54.
Spanek, et al., "The BlueGame Project: Ad-hoc Multilayer Mobile Game with Social Dimension", Retrieved at<< http://www.rdc.cz/en/publications/publications/spanek07bluegame.pdf>>, Dec. 10-13, 2007, pp. 2.
Chen, et al., "Designing a Self-contained Group Area Network for Ubiquitous Learning", Retrieved at<< http://www.ifets.info/journals/11_2/3.pdf>>, Designing a Self-Contained Group Area Network for Ubiquitous, Learning Educational Technology & Scoeity, 2008, pp. 16-26.

* cited by examiner

*Primary Examiner* — Justin Lee
(74) *Attorney, Agent, or Firm* — Pablo Tapia; Doug Barker; Micky Minhas

(57) ABSTRACT

A proximity matching system may use broadcast wireless identifiers transmitted by users' devices to match users with other nearby users. The identifiers may be collected by a plurality of agents, then the identifiers may be matched with pre-defined profiles to generate physically proximate users by a remote service. The group of proximate users may be provided to various applications and consumed with summarized properties or individual properties, depending on the approved privacy settings as selected by the users. In some embodiments, the broadcast wireless identifiers may be personal area network identifiers, local area network identifiers, cellular network identifiers, or other broadcast identifier. In some embodiments, the agents may not establish a peer to peer or other connection with the broadcasting device. The agents may be fixed or mobile agents, and the proximity of users may be generated through links between nearby agents in a meshed fashion.

18 Claims, 4 Drawing Sheets

WIRELESS IDENTIFIERS FOR PROXIMITY APPLICATIONS

BACKGROUND

Information about persons in close proximity may enable many different applications. Identifying the persons nearby can be difficult, especially considering privacy concerns.

SUMMARY

A proximity matching system may use broadcast wireless identifiers transmitted by users' devices to match users with other nearby users. The identifiers may be collected by a plurality of agents, then the identifiers may be matched with pre-defined profiles to generate physically proximate users by a remote service. The group of proximate users may be provided to various applications and consumed with summarized properties or individual properties, depending on the approved privacy settings as selected by the users. In some embodiments, the broadcast wireless identifiers may be personal area network identifiers, local area network identifiers, cellular network identifiers, or other broadcast identifier. In some embodiments, the agents may not establish a peer to peer or other connection with the broadcasting device. The agents may be fixed or mobile agents, and the proximity of users may be generated through links between nearby agents in a meshed fashion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
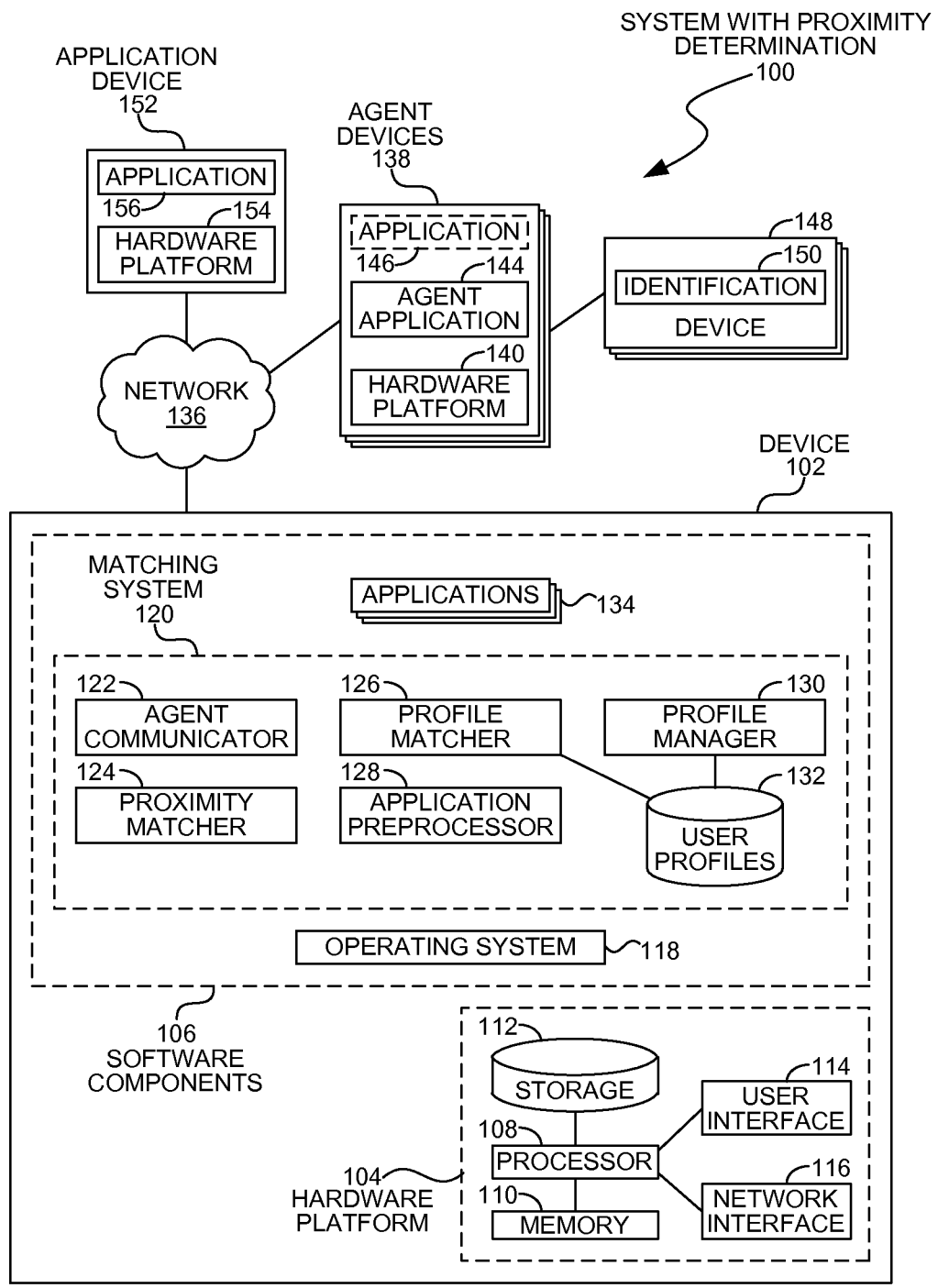
FIG. 1 is a diagram of an embodiment showing a network environment with a proximity matching system.

A system determines groups of proximate users by monitoring wireless broadcast identifiers and using a remote service to identify groups of users. The wireless broadcast identifiers may be gathered by various agents, which may monitor nearby wireless devices and transmit the wireless identifiers to the remote service. The remote service may match devices whose identifiers are received by the same agent, as well as devices gathered by agents that are determined to be near each other.

The groups of users may have profiles associated with one or more wireless broadcast identifiers, where the profiles may contain information consumed by various applications. The profiles may be created and maintained by the users, and the users may identify what information, if any, may be shared with specific applications.

The system may create application consumable information, which may include summarized information or individual information that may be used for various applications.

In some embodiments, an application may execute on the same hardware platform as a gathering agent.

The matching system may match users whose wireless broadcast identifiers are received by the same gathering agent, and may further match users whose gathering agents are somehow related or nearby. The gathering agents may be related by physical proximity when the same wireless broadcast identifier is received by two gathering agents, as well as when the two gathering agents are able to sense each other using wireless communications.

The system may gather wireless broadcast identifiers and forward the wireless broadcast identifiers to the remote service without actually establishing two way communications with the user's device. Such a system may passively monitor the presence of the user's device and enable physical presence-sensitive applications without having the user manually check in or activate the application.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100, showing an environment in which a proximity matching system may operate. Embodiment 100 is a simplified example of a network environment that may include a set of agent devices that collect wireless identifiers and a device that operates a matching service to determine groups of devices. The groups of devices may be consumed by an application.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a matching service that may identify nearby devices and provide various applications with user profiles. The matching service may receive wireless identifiers from one or more collection agents, then attempt to match user's proximities by analyzing which user's devices were detected by the collection agents.

The collection agents may operate by merely scanning the broadcast wireless identifiers associated with wireless devices. Many different types of wireless devices may have unique identifiers associated with the devices. Many different types of wireless standards may enforce unique identifiers for each compatible device. For example, Bluetooth personal area network (PAN) devices may have unique identifiers associated with any Bluetooth device. Similarly, each wireless local area network (LAN) device that operates an IEEE 802.11 or IEEE 802.16 device may have a unique Media Access Control (MAC) identifier. In a cellular telephone network, each device compatible with the network may have an Electronic Serial Number (ESN) that is unique to the device. Many other wireless systems may have other identification schemes.

The wireless devices may continually broadcast their wireless identifiers while the devices are turned on and their radios are broadcasting. The wireless identifiers may be used within the particular wireless standard as part of a mechanism for establishing one-way or two-way communications with the device. For example, a Bluetooth device may periodically broadcast its identifier so that a listening device may recognize the device and establish a pairing with the device, if such a pairing has been previously established.

Many wireless standards may have a mechanism for configuring a two-way wireless communication session, and many such standards may have a defined protocol for establishing an initial connection and later reconnecting with or without user interaction. Such standards may operate by detecting the presence of a broadcasting device and automatically establishing a communication session. The presence may be determined when the device broadcasts a unique identifier within range of another device operating the same protocol.

The collection agents may operate by gathering merely the broadcast identifiers from nearby devices. In many embodiments, the agents may not establish two-way communications or perform any acknowledgment of the presence of the broadcasting device. The agents may operate in a passive manner to merely collect identifiers and the users of the broadcasting devices may not know that the identifiers are being collected.

The broadcasting devices may be any type of radio that transmits an identifier. In many cases, the identifier may be unique, although some embodiments may use non-unique identifiers.

The matching service may identify nearby devices by analyzing which devices are within range of the various collection agents. Two devices that are within range of the same collection agent may be considered to be near each other. When two collection agents are near each other, all of the devices that are within range of the two collection agents may be considered to be near each other. Such groupings may be consumed by various applications.

In one example application, an application may help attendees at a conference to meet, mingle, and exchange contact information. The application may present the user's pictures on a large screen so that all of the attendees will know that those people are in the room. The application may consume information from a matching system that detects user's wireless device's broadcast identifiers, determining which users are nearby a collection agent in the conference room, and transmits the user information to the application.

The matching service may have a set of user profiles to which various broadcast identifiers are associated. The user profiles may be a mechanism to associate actual user information with one or more broadcast identifiers of a user's personal wireless devices.

The matching service may assist a user in creating and maintaining a user profile. In a typical use scenario, a user may create a new user profile or associate an existing user profile with the matching service. The user profile may contain any type of information that a user may wish to share or that an application may consume. When editing a profile, a user may identify one or more devices to associate with the profile. The user profile may contain many different device identifiers, including device identifiers from different types of wireless devices.

For example, a user may associate Bluetooth wireless identifiers from a cellular telephone, Bluetooth headset, a laptop computer, a Bluetooth identification dongle, or other Bluetooth device. The same user may also register wireless LAN identifiers for the cellular telephone and laptop computer, and may also register a cellular telephone's cellular identifier as well.

The collection agents may monitor nearby devices on a wireless connection and transmit the wireless identifiers to a matching service. The collection agents may be lightweight, simple applications that may execute in the background on one or more devices. In some cases, the collection agents may also collect and transmit location information, such as GPS location information, and transmit the location information to the matching service.

The collection agents may operate on a device that is fixed or mobile. A fixed device may be a wireless access point, for example, or other fixed device. In some embodiments, the location of a collection agent may be known to the matching service when the collection agent establishes contact with the matching service.

The device 102 may operate as a matching service, and may have a set of hardware components 104 and software components 106. The client device 102 may represent any type of device that may communicate on a network.

The hardware components 104 may represent a typical architecture of a computing device, such as a desktop or server computer. In some embodiments, the client device 102 may be a personal computer, game console, network appliance, interactive kiosk, or other device. The client device 102 may also be a portable device, such as a laptop computer, netbook computer, personal digital assistant, mobile telephone, or other mobile device.

The hardware components 104 may include a processor 108, random access memory 110, and nonvolatile storage 112. The processor 108 may be a single microprocessor, multi-core processor, or a group of processors. The random access memory 110 may store executable code as well as data that may be immediately accessible to the processor 108, while the nonvolatile storage 112 may store executable code and data in a persistent state.

The hardware components 104 may also include one or more user interface devices 114 and network interfaces 116. The user interface devices 114 may include monitors, displays, keyboards, pointing devices, and any other type of user interface device. The network interfaces 116 may include hardwired and wireless interfaces through which the device 102 may communicate with other devices.

The software components 106 may include an operating system 118 on which various applications may execute. The device 102 may host a matching system 120 that may receive identifiers 150 for various devices 148 that are collected by agent devices 138.

The matching system 120 may include an agent communicator 122 that may be an interface with the various agent devices 138. The agent communicator 122 may establish communications with various agents. For each agent, the agent communicator 122 may determine the physical location of the agent, if available, along with information about the agent.

In some embodiments, the agents may have specific applications that consume identifiers for devices in that specific area. For example, a night club may install several agents that collect identifiers for patrons who visit the night club. The agents associated with the night club may register with the matching system 120 through the agent communicator 122 to receive certain data about the patrons or to operate a specific application against data collected at the agents.

Each agent may have a known or implied physical location. In some embodiments, an agent may have a Global Positioning System (GPS) receiver or other positioning input. In some cases, the agent may be able to determine a position through Internet Protocol analysis, proximity to other agents, proximity to other hardwired or wireless devices, or other mechanism.

In some cases, the agent devices 138 may be in a fixed location. In one such embodiment, an agent may be a personal computer, router, wireless access point, or other hardwired device may be physically located in the same position. In other embodiments, an agent may be a portable laptop or tablet computer, cellular telephone, or other mobile device.

In some embodiments, the agents may not have a known location. In some embodiments, the locations of the agents may be implied when one or more devices 148 are observed by two agents simultaneously or within a close time period. Such matching may be performed by the proximity matcher 124.

The proximity matcher 124 may be capable of linking various agents together into a group. Two agents who simultaneously or within a close time period sense the same device 148 may be determined by the proximity matcher 124 to be near each other. In some cases, one agent may be able to sense another agent. By linking various agents together, the devices 148 that are detected by any of the linked agents may be grouped together as being physically present.

When a device's identification 150 is captured by an agent and transmitted to the matching system 120, a profile matcher 126 may attempt to determine if the identification is known in the user profiles database 132. When there is a match, information about the device or user associated with the device may be passed to an application preprocessor 128 that may prepare the information for consumption by various applications 134.

The applications 134 may consume information regarding the people or devices 148 in proximity to certain agent devices 138. In a simple example, an application 134 may display all of the known people who are in a room. Within the room may be an agent device 138 that may collect broadcast identifications 150 from various devices 148 that may be in the room. The application 134 may receive profile information, such as user's names or a picture of the user, and may display the user names and pictures on a graphical display.

The applications 134 may be operable on the device 102 in some cases, or as an application 146 on the agent devices 138. In some cases, an application 156 may execute on an application device 152 with a separate hardware platform 154.

The matching system 120 may have a profile manager 130. The profile manager 130 may have a user interface or other mechanism to register users and collect information about the various devices 148 that may be tracked.

In one embodiment, users may individually register their devices, such as cellular telephones, Bluetooth headsets, wireless laptop or tablet computers, or other devices. In one such embodiment, the user may cause their device to transmit and a receiver may receive the unique identification for the device over the air. The identification may then be stored with the user's information and used to determine when a user is near an agent.

The profile manager 130 may create a profile in the user profiles database 132 that may be used by the profile matcher 126 when a device is detected.

The device 102 may connect to various agent devices 138 over a network 136. The network 136 may be a local area network, wide area network, the Internet, and may be hardwired, wireless, or a combination of hardwired and wireless.

The agent devices 138 may execute an agent application 144 on a hardware platform 148, which may be like the hardware platform 104 containing a processor. The agent application may passively receive identifications 150 from various devices 148 nearby and may transmit those identifications 150 to the matching system 120 of device 102.

In some embodiments, the agent applications may be lightweight, simple programs that monitor the broadcast identifications and transmit those identifications to the device 102. In some cases, the agent applications 144 may periodically collect all of the identifications every few seconds, minutes, or hours, depending on the embodiment. In some embodiments, the agent applications 144 may operate continuously and transmit each identification as the identification is received.

In many embodiments, the agent applications 144 may maintain a current list of devices 148 within range of the agent device 138. In such embodiments, the agent application 144 may transmit an identification 150 to the device 102 when a device enters and when a device leaves the range of the agent device 138.

In some embodiments, the agent applications 144 may push data to the matching system 120. In such an embodiment, the agent applications 144 may determine that there is some data to transmit, and then may transmit the data.

In other embodiments, the agent applications 144 may operate in a pull mode, where the agent communicator 122 may poll or request information from the agent application 144. In such an embodiment, the agent communicator 122 may transmit a request and the agent application 144 may transmit a response containing information about the identifications 150 that have been recently detected.

The devices 148 may be any type of device that transmits a wireless identification 150. For example, a cellular telephone may broadcast an ESN periodically, a WiFi enabled device may transmit a MAC address, and a Bluetooth device may transmit a unique identifier.

Figure 2:
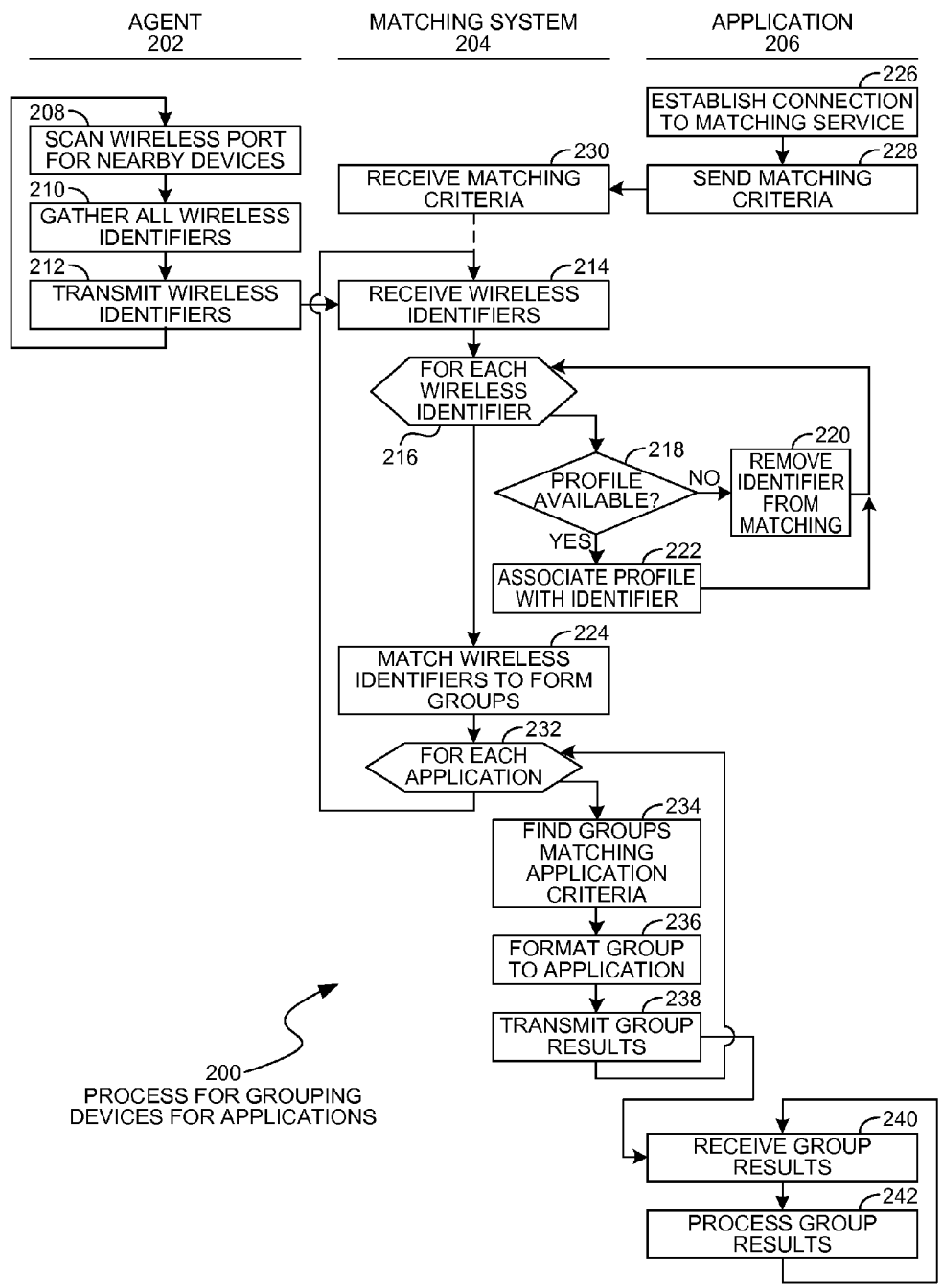
FIG. 2 is a flowchart of an embodiment showing a method for grouping devices for applications.

FIG. 2 is a flowchart illustration of an embodiment 200 showing a method for grouping devices for applications. Embodiment 200 is a simplified example of a method that may be performed by an agent 202 in the left column, a matching system 204 in the center column, and an application 206 in the right column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The agent 202 may be deployed in physical proximity to the users who may have registered devices. The agent 202 may also be located in a specific location where the application 206 may intend to operate. For example, several agents may be deployed at a sports event and the application 206 may track the users or send the users specific information or data about the sports event.

The agent 202 may operate by scanning a wireless port for nearby devices 208. The wireless port may be any port or any wireless protocol in which devices may broadcast identifier. The wireless identifiers may be gathered in block 210 and transmitted in block 212 to the matching system 204, which may receive the identifiers in block 214.

After receiving the identifiers in block 214, each identifier may be processed in block 216. For each identifier in block 216, a query to a user profile database may be made to determine if the profile is available in block 218. If the profile is not available, the identifier may be ignored in block 220.

If the profile is available in block 218, the profile may be retrieved and associated with the identifier in block 222.

After processing all of the available identifiers, the identifiers may be matched to form groups in block 224. The matching process may group identifiers that are received by the same agent and by agents near each other into a group. The matching process may consolidate the results from two or more agents into a single group.

The application 206 may establish a connection to the matching system 204 in block 226. In block 228, the application 206 may transmit matching criteria, which may be received by the matching system 204 in block 230. The matching criteria may define any parameter for which a group of users may be identified. In many cases, the matching criteria may be a physical location, but the matching criteria may also include parameters relating to the type of persons identified or other parameters.

In many embodiments, multiple applications may establish connections to the matching system 204. Each application may have different criteria for the type of information that they wish to obtain. For example, one application may want to receive pictures of users that are near specific agents. Another application may want to know only the female users over age 50, in another example.

When multiple applications use a centralized matching service, the matching service may collect information from many different agents located across a country or even across the globe. Each application may register with the matching service to receive specific types of data in a specific form. In some embodiments, two or more applications may request data derived from the same agents.

In block 232, each application may be processed. For each application in block 232, groups matching the application's criteria are found in block 234 and the data are formatted for the application in block 236. The data may be transmitted to the application in block 238, which may be received in block 240 and processed in block 242 by the application. The process of block 238 may return to block 232 to process additional applications.

Figure 3:
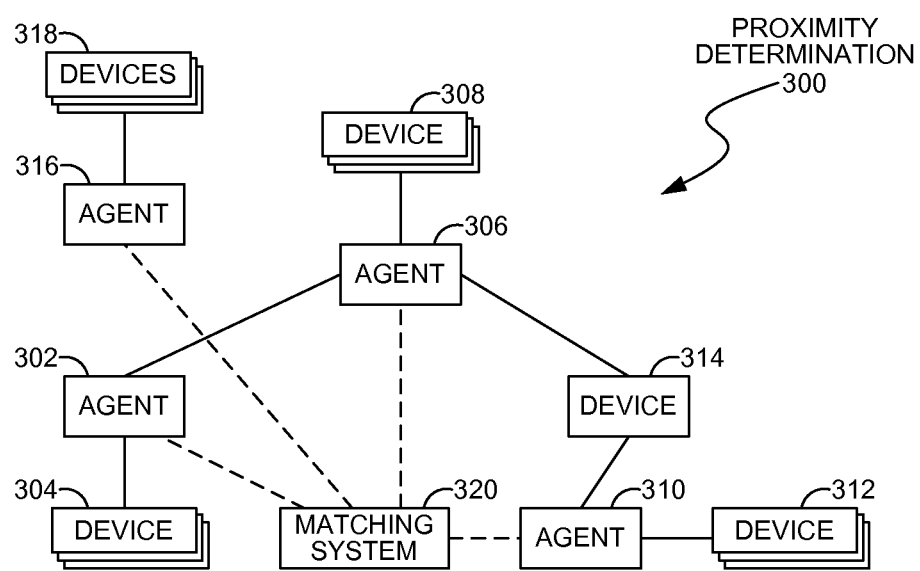
FIG. 3 is a diagram of an example embodiment showing various connections between agents and devices.

FIG. 3 is a diagram of an embodiment 300, showing an example of how proximity determination may operate. Embodiment 300 illustrates various devices and agents and represents how the proximity of one device may be inferred by knowing the location of other devices.

Embodiment 300 illustrates a simplified example showing a matching system 320 that receives information from agents 302, 306, 310, and 316. Agent 302 may detect devices 304, agent 306 may detect devices 308 and 314, while agent 310 may detect device 312 and 314. Agent 316 may detect devices 318.

The example of embodiment 300 illustrates several mechanisms or situations where inferences about proximity may be drawn based on what information the agents may collect.

Agent 316 detecting devices 318 illustrate a case where the only proximal devices are devices 318. Because there are no common connections between the agent 316 and devices 318 and any other agent and devices, the devices 318 identified by the agent 316 can only be inferred to be proximal to each other. When the agent 316 is in a known location, either by virtue of having a GPS receiver, IP address location, manual location entry, or other mechanism, the devices 318 within range of the agent 316 may be determined to be in the physical area of the agent 316.

Agent 302 may detect devices 304 as well as agent 306. Because agent 302 and agent 306 are detected by each other, the devices 304 may be inferred to be nearby the devices 308, even though both sets of devices were detected by different agents.

Agents 306 and 310 may detect a common device 314. Because both agents 306 and 310 detect a common device 314, the location of the agents 306 and 310 may be inferred to be nearby each other and therefore, the devices 308 detected by agent 306 may be inferred to be nearby devices 312 detected by agent 310.

In some embodiments, the link between agents 306 and 310 may be made when both agents 306 and 310 detect the same device 314 simultaneously. In some embodiments, the detection may occur within a specific time period, such as seconds, minutes, or hours, to determine that agents 306 and 310 are nearby each other.

In some cases, the various agents may be contained in mobile devices, such as cellular telephones, laptop computer, tablet computers, or other devices. When using mobile agents, the matching system 320 may infer location and proximity of many different devices by analyzing the current data collected and matching any commonly identified devices or agents. In many cases, the commonly identified devices, such as device 314, may not be a device that may be registered with the matching system 320 but may be used for matching the agents 306 and 310.

Figure 4:
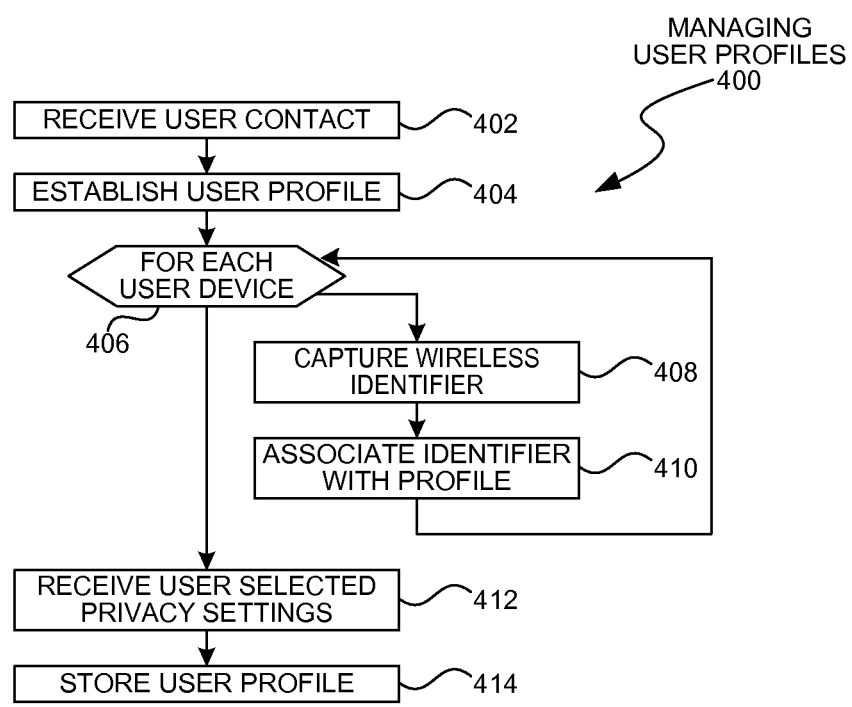
FIG. 4 is a flowchart of an embodiment showing a method for managing user profiles.

FIG. 4 is a flowchart illustration of an embodiment 400 showing a method for managing user profiles. Embodiment 400 is a simplified example of a method that may be performed by a profile manager, such as the profile manager 130 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The operations of embodiment 400 illustrate one mechanism by which a user may establish an account with a matching system.

In block 402, the user may make contact with the profile manager and establish a user profile in block 404. The user profile may include a user name, password, alias or nickname, or other information. In some cases, a user may upload photographs, provide links to social network sites, or other activities.

In some cases, the profile manager may collect personally identifiable information. In such cases, the user may give explicit permission for such information to be collected and may be able to restrict the usage of and access to such information.

For each device the user may register in block 406, a wireless identifier may be captured in block 408 and may be associated with the profile in block 410.

In many embodiments, a user may have a client device that has receivers for Bluetooth, WiFi, WiMAX, or other wireless devices. Such a client device may be a personal computer, for example. When the wireless identifier is captured in block 408, the user may be instructed to place their device in a discovery mode or to activate the device such that the client device may be able to sense the device. The client device may capture the identifier over the air and store the identifier. In some embodiments, the user may have to manually type an address, such as a MAC address, in order to capture the identifier.

After collecting identifiers for the various wireless devices, the user's privacy settings may be captured. In some embodiments, the user may permit access to the user's information for a limited number or type of applications, as well as restrict usage of the information to outside organizations.

The user profile may be stored in block 414.

In many embodiments, a user may be able to edit their profile repeatedly to add new devices, remove devices, change privacy settings, add or delete other information in the profile, or perform other edits or changes.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
an agent communicator that receives wireless broadcast identifiers from a plurality of agents;
a proximity matcher that matches wireless broadcast identifiers with a first agent to determine and to form a group of broadcast identifier, the proximity matcher identifies two related agents by finding a common broadcast wireless identifier received by two related agents;
a profile matcher that retrieves a profile for each of said wireless broadcast identifier; and
an application preprocessor that generates a set of application consumable information based on said profiles.

2. The system of claim 1 further comprising:
a profile manager that receives a profile request from a user and associates user information with at least one wireless broadcast identifier to create one of said profiles.

3. The system of claim 2, said profile comprising a plurality of wireless broadcast identifiers.

4. The system of claim 2, said profile further comprising a set of personally identifiable information policies selected by said user.

5. The system of claim 1, said broadcast wireless identifiers being received with timestamps.

6. The system of claim 1, said proximity matcher receiving said broadcast wireless identifiers on a repeating basis.

7. The system of claim 1, said agent communicator receiving a geophysical location identification from a first agent.

8. The system of claim 1, said set of application consumable information comprising summarized information a plurality of users associated with said group of wireless broadcast identifiers.

9. The system of claim 1 further comprising:
an application communicator that transmits said set of application consumable information to an application.

10. The system of claim 9, said application being executed on a first agent.

11. The system of claim 9, the proximity matcher identifies two related agents by identifying two agents receiving a wireless broadcast identifier of a device within a predetermined time period.

12. A method comprising:
receiving a plurality of wireless broadcast identifiers gathered from a plurality of agents, each of said wireless broadcast identifiers being associated with a specific agent;
matching said wireless broadcast identifiers to form groups of users having a physically proximate location, each of said users being associated with at least one wireless broadcast identifier, the matching comprising identifying a plurality of agents having physical proximity and determining a group comprising a plurality of users associated with all of the plurality of agents the physical proximity being determined by having a first wireless broadcast identifier in common;

creating a set of application consumable information comprising information determined from profiles associated with said users in said groups of users; and transmitting said application consumable information to an application.

13. The method of claim 12, said first wireless broadcast identifier being received by said plurality of agents within a predefined period of time.

14. The method of claim 12, said wireless broadcast identifier being transmitted under a radio standard being one of a group composed of:
Bluetooth;
cellular telephony;
IEEE 802.11; and
IEEE 802.16.

15. The method of claim 12, the physical proximity being determined by two agents receiving a wireless broadcast identifier of a device within a predetermined time period.

16. A system comprising:
a plurality of gathering agents, each of said gathering agents that receives broadcast identifiers from wireless devices and transmits said broadcast identifiers to a remote service;
a remote service that:
receives a plurality of wireless broadcast identifiers and agent identifiers from said plurality of gathering agents;
for at least a subset of said wireless broadcast identifiers, identifies a user profile associated with said wireless broadcast identifier;
forms a group of proximate users by matching said wireless broadcast identifiers associated with said gathering agents;
creates a set of application consumable information comprising information determined from said user profiles; and
transmits said application consumable information to an application.

17. The system of claim 16, said gathering agents that gather said wireless broadcast identifiers from a plurality of user devices without establishing two way communications with said user devices.

18. The system of claim 17, said application being configured to establish two way communications with said user devices through a secondary communication path, said secondary communication path being a different communication path than a wireless communication path that broadcast said broadcast wireless identifier.

* * * * *